United States Patent
Revoir et al.

[15] 3,662,523
[45] May 16, 1972

[54] ADSORBENTS FOR REMOVAL OF MERCURY VAPOR FROM AIR OR GAS

[72] Inventors: William H. Revoir, West Hartford, Conn.; John A. Jones, Springfield, Mass.

[73] Assignee: American Optical Corporation, Southbridge, Mass.

[22] Filed: Dec. 15, 1970

[21] Appl. No.: 98,318

[52] U.S. Cl. .................................55/387, 55/72, 23/2 S, 252/441
[51] Int. Cl. .................................B01d 53/04, B01j 11/78
[58] Field of Search .................55/72, 74, 387, 71; 252/441, 252/431; 23/2 S

[56] References Cited

UNITED STATES PATENTS 1,984,164  12/1934  Stock.....................................252/441

Primary Examiner—Charles N. Hart
Attorney—William C. Nealon, Noble S. Williams, Robert J. Bird and Bernard Sweeney

[57] ABSTRACT

Adsorbents for removal of mercury vapor from air or gas including activated carbon granules impregnated with interhalogen compounds, particularly iodine monochloride and iodine trichloride.

2 Claims, 3 Drawing Figures variation of increase in weight of carbon due to impregnation by iodine monochloride and iodine trichloride with time of impregnation initial weight of each carbon batch: 200 grams temperature of impregnation: 40° C air flow rate: 10 LPM

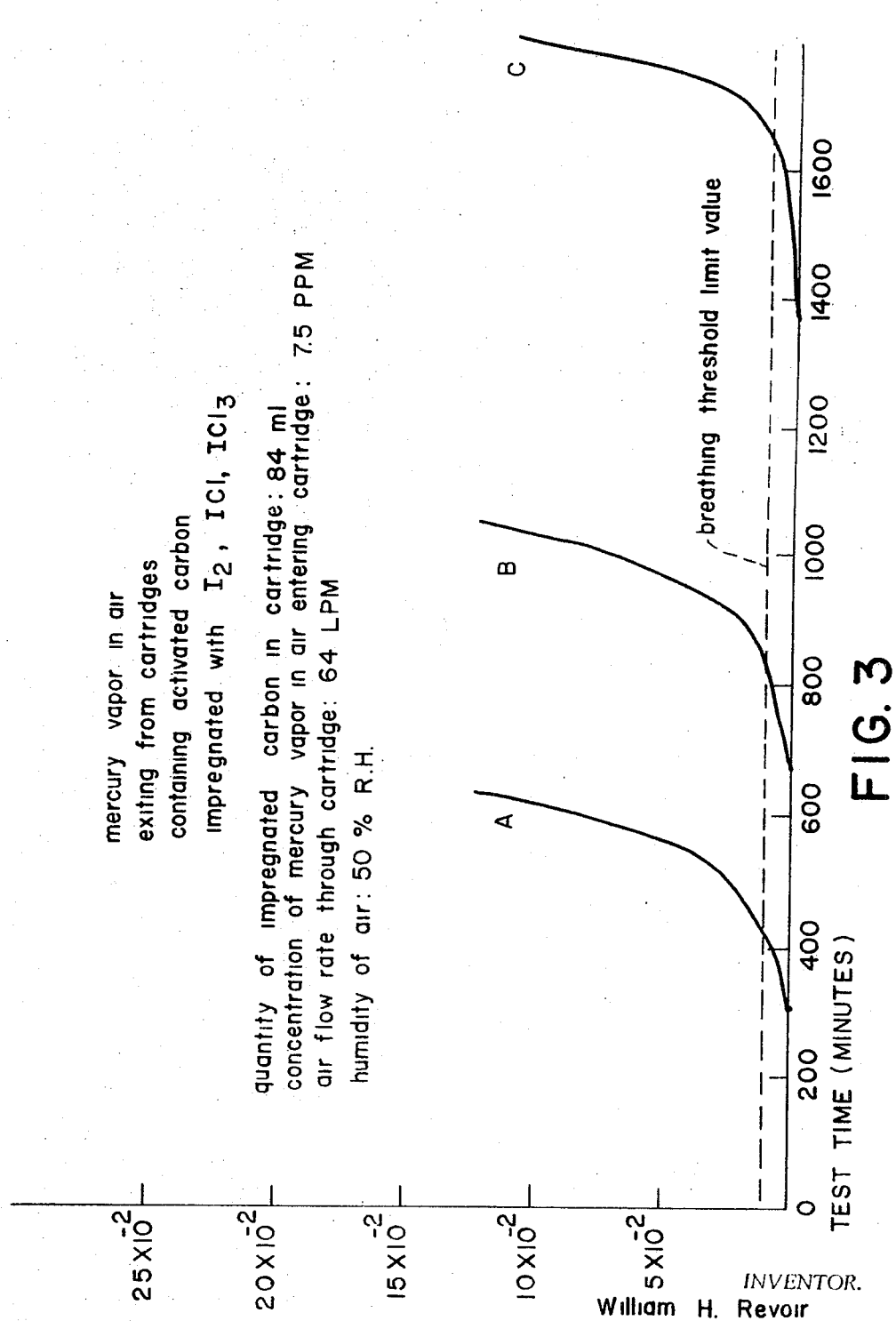

ADSORBENTS FOR REMOVAL OF MERCURY VAPOR FROM AIR OR GAS

BACKGROUND OF THE INVENTION

The present invention relates in general to adsorbent materials and more particularly to adsorbent materials for the removal of toxic mercury vapor from air or gasses.

In the prior art, the best adsorbent we knew of for mercury vapor is a composition of activated carbon granules impregnated with the iodine. The iodine impregnant in activated carbon granules reacts with mercury vapor to yield the solid mercuric iodide which remains in the carbon granules. Respirator filters and canisters in present usage generally contain this active ingredient for protection against mercury vapors.

SUMMARY OF THE INVENTION

It is an object of the present invention to provide an adsorbent material for mercury vapor of improved effectiveness which will permit a longer useful life for a given size filter element, or conversely permit a smaller size filter element for a given useful life.

These objects are realized by an adsorbent material for mercury vapor including a composition of activated carbon granules impregnated with iodine monochloride. In another form, the activated carbon granules are impregnated with iodine trichloride.

DRAWING

FIG. 3 is a comparison chart showing the relative effectiveness of filters containing equal amounts, by weight, of adsorbent.

DESCRIPTION

In general, the composition of this invention includes activated carbon granules impregnated with an interhalogen compound for use as an adsorbent material for mercury vapor. In particular, two interhalogen compounds are presently preferred. These are iodine monochloride and iodine trichloride. While both are suitable and both a great improvement over iodine, for purposes of Rule 71b, iodine trichloride adsorbent is presently contemplated as the best mode of carrying out this invention. However, other factors than chemical reaction with mercury might effect this preference. These compounds react with mercury to produce mercuric iodide and mercuric chloride, non-volatile solids.

The reaction of vaporous mercury and iodine (prior art) is represented by the equation:

$$Hg + I_2 \rightarrow Hg I_2.$$

The reaction of vaporous mercury and iodine monochloride is represented by the equation:

$$2Hg + 2I Cl \rightarrow Hg Cl_2 + Hg I_2.$$

The reaction of vaporous mercury and iodine trichloride is represented by the equation:

$$4Hg + 2I Cl_3 \rightarrow 3Hg Cl_2 + Hg I_2.$$

Figure 1:
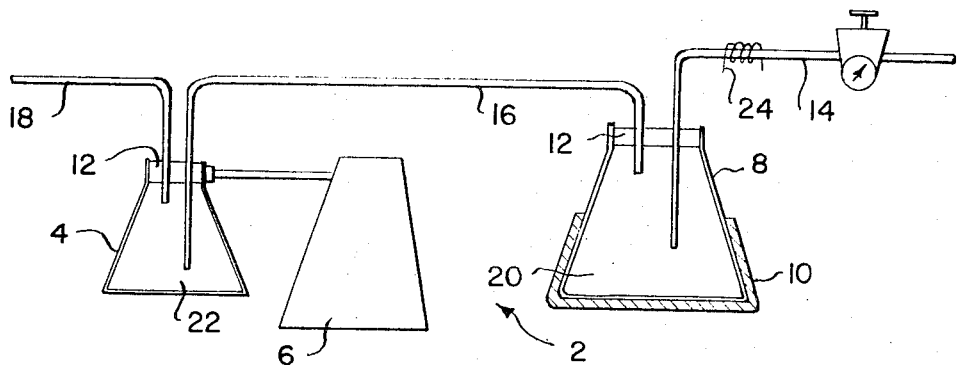
FIG. 1 is a diagram of an apparatus for the impregnation of carbon granules with iodine chloride or iodine trichloride.

Referring now to FIG. 1, a laboratory apparatus is shown in which carbon granules are impregnated with iodine monochloride or iodine trichloride. In this apparatus, generally, indicated at 2, is included a flask 4 containing activated carbon granules 22 and operatively connected to a mechanical vibrator 6. A flask 8 contains the liquid iodine monochloride 20 (or iodine trichloride). A heating element 10 surrounds flask 8. Flasks 4 and 8 are suitably capped by stoppers 12, each having two appertures for the passage of tubing. An air line 14 which is covered with a heating tape 24 introduces controlled air at a positive pressure and at an elevated temperature to flask 8. Vapor line 16, which is covered with thermal insulation material, connects flasks 4 and 8, and exhaust line 18 leads from flask 4 to atmosphere.

Iodine monochloride (or iodine trichloride) is heated in flask 8. Air from line 14 drives the resulting vapor from flask 8 through vapor line 16 into a bed of granulated carbon 22 in flask 4. The granulated carbon is agitated so as to provide an even distribution of the vapor through the granules. This vapor is continually adsorbed in the carbon until a desired weight increase is achieved. For purposes of this experiment, a 15 percent weight increase has been used as the standard for comparison. Thus, identical samples of granulated carbon are impregnated respectively with a desired weight increase of iodine monochloride and iodine trichloride.

Figure 2:
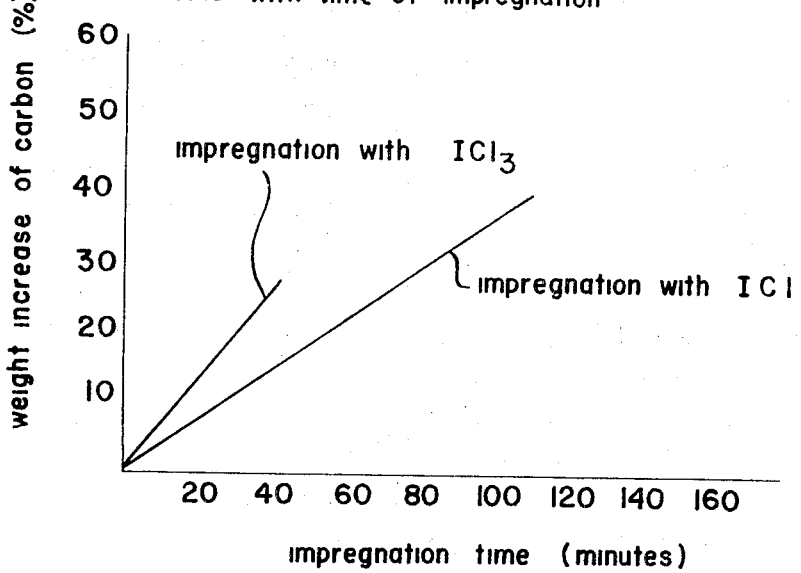
FIG. 2 is a curve of weight increase of carbon vs. time of impregnation with adsorbent.

FIG. 2 is representative of weight increase-time relationship, showing that the weight increase of the carbon is substantially linear with respect to time of impregnation. The separate curves represent the impregnation times with iodine monochloride and iodine trichloride, as shown.

FIG. 3 is a plot of mercury vapor concentration in a filter exhaust, relative to the time duration of the passage of such vapor through a filter. The dashed line on this graph represents a safety threshold level. Curves A, B, C represent the data for filters containing equal weight percentages (15 percent) of iodine, iodine monochloride, and iodine trichloride, respectively. The amounts of activated carbon are the same in each case. From this graph, it will be apparent that the breathing threshold limit level in this experiment was reached at approximately 400 minutes with iodine, 800 minutes with iodine monochloride, and 1,600 minutes with iodine trichloride.

From the foregoing equations, it is apparent that equal numbers of iodine and iodine monochloride molecules react with equal numbers of mercury atoms. Thus, if the reactions were allowed to go to completion, (the filters exhausted) equal numbers of adsorbent molecules of iodine or iodine monochloride would react with the same quantity of mercury. However, due to the nature of the use of this invention, reactions do not go to completion. As an illustration, vapor containing 100 ppm mercury is passed through a filter until the effluent contains 1 ppm mercury. (If the adsorbent were allowed to completely react, the vapor would be passed through the filter until the effluent contained the same mercury concentration as the input vapor).

The pronounced improvement in the efficiency of the interhalogens as mercury adsorbents, as compared to iodine, is partially accounted for by the fact that interhalogen compounds are more reactive than individual halogens. The combination of halogens in inter-halogen compounds produces a synergistic effect.

Other interhalogen compounds could be used to produce the enhanced adsorbtion effect on mercury. They are not presently preferred for this use, however, primarily because of economic, not chemical considerations. Examples of such compounds are:

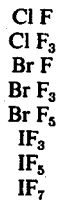

Cl F
Cl F$_3$
Br F
Br F$_3$
Br F$_5$
IF$_3$
IF$_5$
IF$_7$

It will be apparent that an adsorbent material of activated carbon granules impregnated with iodine monochloride or iodine trichloride has greater effectiveness than the prior art material of activated carbon granules impregnated with iodine. Thus, by the use of this invention, greater capacity mercury vapor filters can be provided of a given size, or conversely smaller filters of a given capacity are made possible. Such filters may be used on respirators to protect personnel against inhalation of mercury vapor or on large industrial processing equipment containing mercury to prevent contamination of the atmosphere with mercury vapor.

What is claimed is:

1. An adsorbent material for the removal of mercury vapor from gas, said material including activated carbon granules impregnated with an interhalogen compound.

2. A gas filter element containing an active material for the adsorption of mercury vapor as defined in claim 1.

* * * * *